United States Patent
Vestal et al.

(10) Patent No.: US 8,316,368 B2
(45) Date of Patent: Nov. 20, 2012

(54) SAFE PARTITION SCHEDULING ON MULTI-CORE PROCESSORS

(75) Inventors: Stephen C. Vestal, North Oaks, MN (US); Pamela Binns, St. Paul, MN (US); Aaron Larson, Shoreview, MN (US); Murali Rangarajan, Plymouth, MN (US); Ryan Roffelsen, Tigard, OR (US)

(73) Assignee: Honeywell International Inc., Morristown, NJ (US)

( * ) Notice: Subject to any disclaimer, the term of this patent is extended or adjusted under 35 U.S.C. 154(b) by 960 days.

(21) Appl. No.: 12/366,369

(22) Filed: Feb. 5, 2009

(65) Prior Publication Data

US 2010/0199280 A1 Aug. 5, 2010

(51) Int. Cl.
*G06F 9/48* (2006.01)
(52) U.S. Cl. ........................................ 718/102; 718/105
(58) Field of Classification Search .................. None
See application file for complete search history.

(56) References Cited

U.S. PATENT DOCUMENTS

| | | | |
|---|---|---|---|
| 5,761,413 A | 6/1998 | Frank et al. | |
| 5,963,911 A * | 10/1999 | Walker et al. | 705/7.12 |
| 6,263,359 B1 * | 7/2001 | Fong et al. | 718/103 |
| 6,678,840 B1 | 1/2004 | Kessler et al. | |
| 7,103,745 B2 | 9/2006 | Koning et al. | |
| 7,386,739 B2 * | 6/2008 | Ghiasi et al. | 713/300 |
| 7,437,581 B2 * | 10/2008 | Grochowski et al. | 713/320 |
| 2003/0217090 A1 * | 11/2003 | Chauvel et al. | 709/102 |
| 2004/0078780 A1 * | 4/2004 | Dutt et al. | 717/106 |
| 2007/0061807 A1 * | 3/2007 | Bibby | 718/102 |
| 2007/0067529 A1 * | 3/2007 | Alsup | 710/200 |
| 2007/0157206 A1 * | 7/2007 | Rakvic et al. | 718/102 |
| 2008/0229128 A1 * | 9/2008 | Heller et al. | 713/320 |

OTHER PUBLICATIONS

Cook, A. etal., ARINC 653—Achieving software re-use, 1997, Elsevier Science, Microprocessors and Microsystems 20, pp. 479-483.*
Lee, Yann-Hang, etal., Partition Scheduling in APEX Runtime Environment for Embedded Avionics Software, 2002, 5th Intl. Conf. on Real-time Computing Systems and Applications, pp. 103-109.*
Rushby, John, Partitioning in Avionics Architectures: Requirements, Mechanisms and Assurance, Mar. 2000, DOT/FAA/NASA, 67 pages.*

* cited by examiner

*Primary Examiner* — Eric Coleman
(74) *Attorney, Agent, or Firm* — Fogg & Powers LLC

(57) ABSTRACT

One example is directed to a method of generating a set of schedules for use by a partitioning kernel to execute a plurality of partitions on a plurality of processor cores included in a multi-core processor unit. The method includes determining a duration to execute each of the plurality of partitions without interference and generating a candidate set of schedules using the respective duration for each of the plurality of partitions. The method further includes estimating how much interference occurs for each partition when the partitions are executed on the multi-core processor unit using the candidate set of schedules and generating a final set of schedules by, for at least one of the partitions, scaling the respective duration in order to account for the interference for that partition. The method further includes configuring the multi-core processor unit to use the final set of schedules to control the execution of the partitions using at least two of the cores.

20 Claims, 6 Drawing Sheets

SAFE PARTITION SCHEDULING ON MULTI-CORE PROCESSORS

BACKGROUND

In modern avionics systems (for example, in Integrated Modular Avionics (IMA) systems), partitioning operating systems are typically used to meet stringent safety- and mission-critical requirements. Aeronautical Radio Inc. (ARINC) has promulgated the "ARINC Specification 653: Avionics Application Standard Software Interface" family of specifications (generally referred to here as "ARINC 653"). The family of ARINC 653 specifications includes a "Draft 3 of Supplement 1 to ARINC Specification 653: Avionics Application Standard Software Interface," published Jul. 15, 2003 (also referred to here as "ARINC 653-1").

ARINC 653 defines an APplication EXecutive (APEX) for space and time partitioning for enabling multiple partitions to share a single processor and memory in order to guarantee that applications executing within one partition cannot adversely affect other partitions in the event of an application failure. Each partition in such an ARINC 653 system represents a separate application and makes use of memory space that is dedicated to it. Similarly, the APEX allots a dedicated time slice to each partition, thus creating time partitioning. Each ARINC 653 partition also supports multitasking within it.

ARINC 653 was defined assuming the use of a single core processor. However, the processor industry has transitioned to multi-core processors for various reasons. As a result, most high-end processors are multi-core processors.

However, the cores of a multi-core processor often share hardware resources and can significantly interfere with each other's performance. This interference can violate the guarantee of robust partitioning (a guarantee that partitions do not interfere with each other) that is fundamental to ARINC 653 and IMA systems. As a result, when such multi-core processors are used to implement ARINC 653 systems, all but one of the cores in the multi-core processors are typically disabled. This is a significantly inefficient use of hardware, and the inefficiency worsens as the number of cores per processor increases.

SUMMARY

One embodiment is directed to a method of generating a set of schedules for use by a partitioning kernel to execute a plurality of partitions on a plurality of processor cores included in a multi-core processor unit. The method includes determining a duration to execute each of the plurality of partitions without interference and generating a candidate set of schedules using the respective duration for each of the plurality of partitions. The method further includes estimating how much interference occurs for each partition when the partitions are executed on the multi-core processor unit using the candidate set of schedules and generating a final set of schedules by, for at least one of the partitions, scaling the respective duration in order to account for the interference for that partition. The method further includes configuring the multi-core processor unit to use the final set of schedules to control the execution of the partitions using at least two of the cores.

Another embodiment is directed to a system comprising a multi-core processor unit comprising a plurality of processor cores and a memory coupled to the multi-core processor unit. The system is configured so that the multi-core processor unit executes, on the plurality of cores, software comprising a plurality of partitions. At least two of the cores are used to execute the partitions. The execution of each partition is scheduled in a manner that satisfies a level of performance assurance that is associated with that partition despite any interference between cores.

Another embodiment is directed to a method of generating a set of schedules for use by a partitioning kernel to control the execution of a plurality of partitions on a plurality of cores included in a multi-core processor unit. The method includes generating the set of schedules so that, for each of a first subset of the partitions, no other partition executes while that partition is being executed on one of the plurality of cores. The method further includes configuring the multi-core processor unit to use the final set of schedules to control the execution of the partitions using at least two of the cores.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
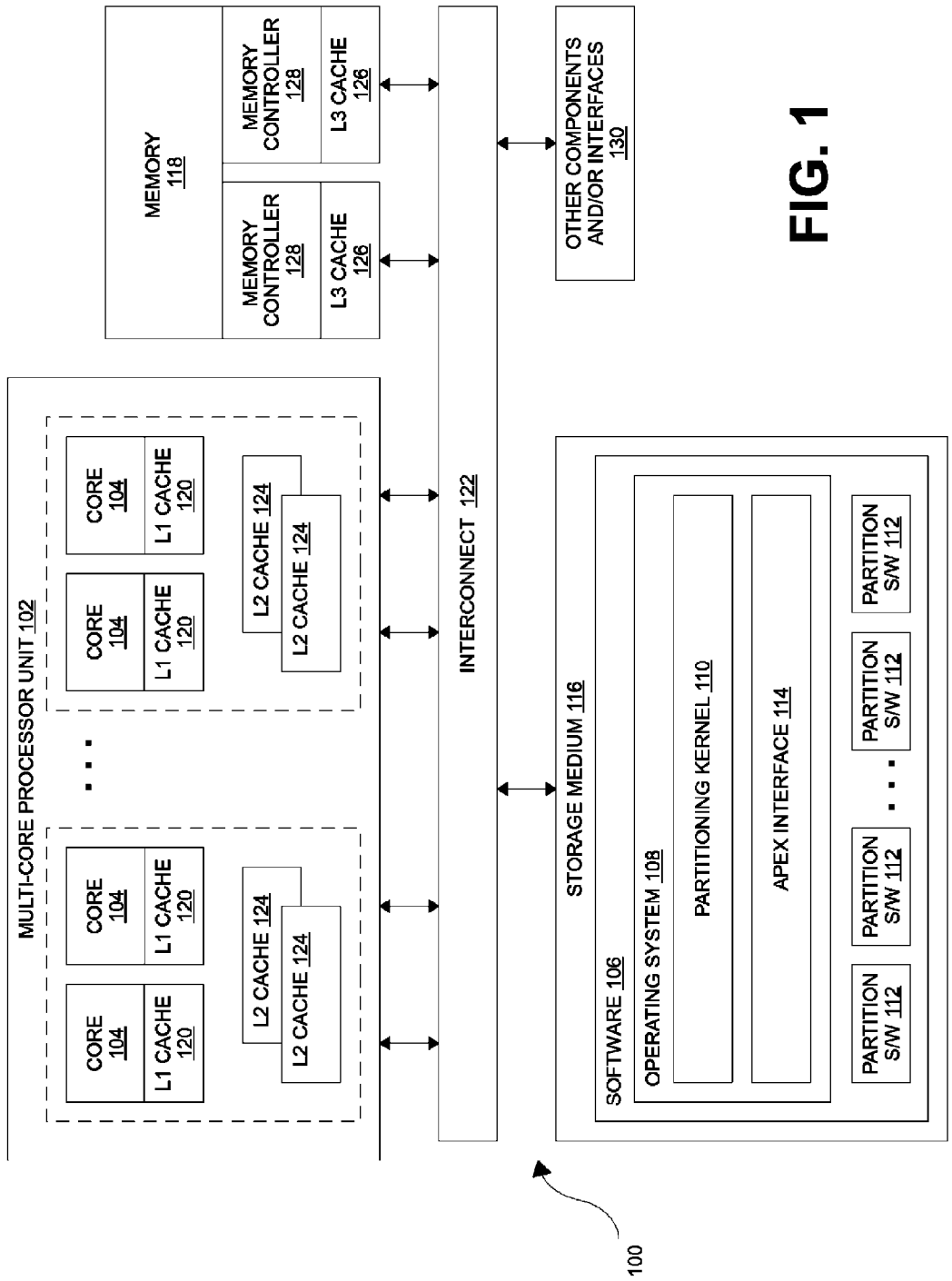
FIG. 1 is a block diagram of one embodiment of a system having a multi-core architecture.

FIG. 1 is a block diagram of one embodiment of a system 100 having a multi-core architecture. For example, the system 100 can be used to implement an integrated modular avionics (IMA) system (though it is to be understood that the system 100 can be implemented in other ways).

System 100 includes a multi-core processor unit 102. The multi-core processor unit 102 comprises multiple processor cores 104. Each processor core 104 can execute program instructions for a respective process or thread. In this embodiment, the multi-core processor unit 102 is used to execute software 106. The software 106 comprises an operating system 108 that includes a partitioning kernel 110, which implements standard kernel functionality to manage access to resources (such as processor cores 104, memory 118, and I/O devices) and allow other software to run and use these resources. Also, the partitioning kernel 110 implements the partitioning functions necessary for the operating system 108 to carry out space and time partitioning.

The software 106 also comprises application-specific partition software 112, which executes in the various partitions that are provided by the partitioning kernel 110. The operating system 108 includes an application executive (APEX)

interface 114 that provides an interface between the partitioning kernel 108 (and the resources accessible therethrough) and the partition software 112. In one implementation of such an embodiment that is suitable for use in the commercial avionics industry as an IMA system, the partitioning kernel 110 and APEX interface 114 support the ARINC 653-1 specification and are implemented in a way that can be certified to an appropriate certification level (such as Level A) defined by the Radio Technical Commission for Aeronautics (RTCA) in its Software Considerations in Airborne Systems and Equipment Certification, DO-178B standard.

The software 106 comprises program instructions that are embodied on or in a suitable storage medium 116 from which at least a portion of the program instructions are read by the appropriate core 104 for execution thereby. The program instructions, when executed by the respective core 104, carry out at least a portion of the functionality described here as being performed by the system 100.

In the particular embodiment shown in FIG. 1, the cores 104 are coupled to a local memory 118 using a multi-level cache scheme. In the multi-level cache scheme used in this embodiment, each of the cores 104 includes a separate, respective level one ("L1") cache 120 that communicates with the memory 118 over an interconnect 122 that is used to communicatively couple the processor unit 102 to the other components of the system 100 (including the memory 118). Each of the cores 104 also includes a separate, respective level two ("L2") cache 124 that communicates with the memory 118 over the interconnect 122.

The multi-level scheme also includes a front-side level three ("L3") cache 126. In this embodiment, there is not a dedicated L3 cache 126 for each of the cores 104 and, instead, the cores 104 must share the L3 caches 126. In the particular example shown in FIG. 1, there are two L3 caches 126 (though other numbers of L3 caches are used in other embodiments).

The local memory 106, the L1, L2, and L3 caches 120, 124, and 126 are implemented using appropriate memory devices (such as random access memory (RAM) devices such as dynamic and static RAM devices and read only memory (ROM) devices).

In the particular embodiment shown in FIG. 1, there are two memory controllers 128, each providing access to the devices that implement the memory 118 via the coherency fabric 122 and a respective one of the L3 caches 126.

In the embodiment shown in FIG. 1, the L1 and L2 caches 120 and 124 are dedicated to a respective core 104, while the L3 caches 126 and the memory controllers 128 are shared among the cores 104.

The cores 104 of the multi-core processor unit 102 are coupled to other components and interfaces 130 (also referred to here as "other resources" 130) using the coherency fabric 122. Examples of such other resources 130 include, without limitation, a datapath acceleration architecture incorporating acceleration for various functions (such as packet parsing, classification, and distribution, queue management for scheduling, packet sequencing, and congestion management, hardware buffer management for buffer allocation and de-allocation, encryption, regular expression pattern matching) ETHERNET interfaces (such as 10 GBps Ethernet (XAUI) controllers and 1 GBps Ethernet (SGMII) controllers), high-speed peripheral interfaces (such as PCI Express v2.0 controllers/ports and serial RapidIO 1.2 controllers/ports), additional peripheral interfaces (such as Universal Serial Bus (USB) controllers, Secure Digital (SD)/MultiMediaCard (MMC) controllers, Serial Peripheral Interface (SPI) controller, Inter-Integrated Circuit (I2C) controllers, dual universal asynchronous receiver/transmitters (DUARTs), enhanced local bus controller (eLBC)), multicore programmable interrupt controller (PIC), and direct memory access (DMA) engines.

In one implementation of such an embodiment, the system 100 is implemented using the FREESCALE QorIQ P4080 multi-core architecture.

Also, although software 106 is shown in FIG. 1 as being stored on or in a storage medium 116 that is separate from the memory 118, it is to be understood that at least a portion the software 106 (and corresponding portions of the storage medium 116) can be in the memory 118.

In this embodiment, the multi-core processor unit 102 is configured so that each core 104 executes a sequence of instructions for only one partition during any given schedule window.

Figure 2:
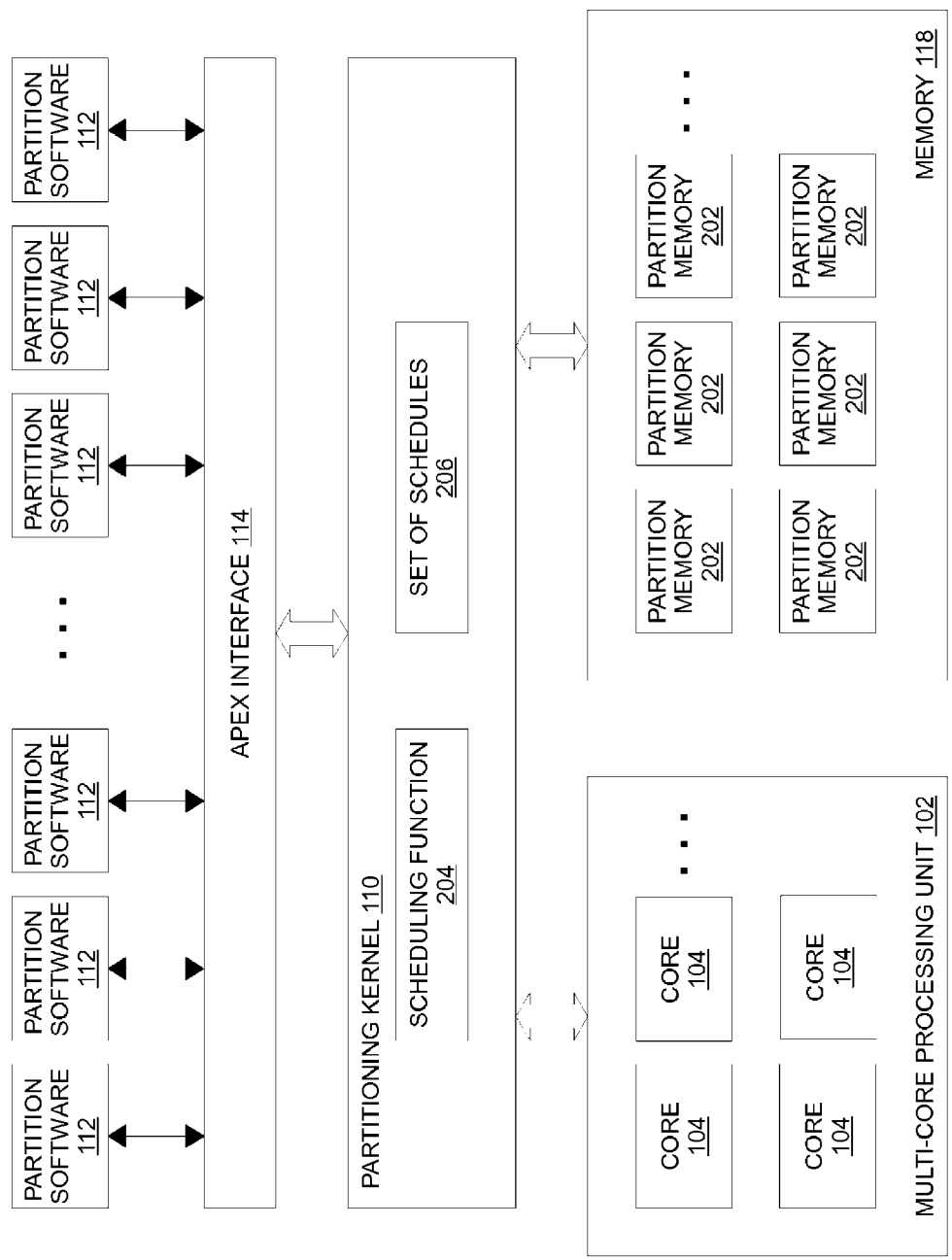
FIG. 2 is a block diagram illustrating how at least two of the cores of the multi-core processor unit of FIG. 1 are used to execute the partition software.

FIG. 2 is a block diagram illustrating how at least two of the cores 104 of the multi-core processor unit 102 of FIG. 1 are used to execute the partition software 112. As noted above, the system 100 is configured to have multiple logical partitions. In each such partition, corresponding partition software 112 is executed on one of the plurality of cores 104 of the multi-core processor unit 102. Also, for each such partition there is a corresponding dedicated portion of the memory 118 (also referred to here as the corresponding "partition memory" 202) that is used by the respective partition software 112 executing in that partition.

The partitioning kernel 110 includes a scheduling function 204 that uses a set of schedules 206 to determine when the partition software 112 for each of the partitions is to execute and on which of the cores 104 it is to execute. In particular, the scheduling function 204 and the set of schedules 206 are configured so that at least two of the cores 104 of the multi-core processor unit 102 may be used to simultaneously execute the partition software 112 for the partitions. In one implementation of such an embodiment, the set of schedules 206 are implemented as a set of schedule tables that are stored on the storage medium 116 on which the operating system 108 (and other configuration data therefor) is stored.

In the embodiment described here, each of the cores 104 of the multi-core processor unit 102 that is used to execute partition software 112 has its own repeating schedule 206. For each repeating period (also referred to here as a "round"), the schedule 206 defines windows of time (also referred to here as "schedule windows") during which the partition software 112 for the partitions that are allocated to that core 104 may execute on that core 104. The scheduling of all cores 104 is synchronized so that events that appear at the same time in multiple schedules 206 occur at nearly identical times on the multiple cores 104 at run-time.

The scheduling function 204 and the set of schedules 206 are configured so that each of the partitions are executed on one of the cores 104 in a manner that satisfies a level of performance assurance that is associated with that partition despite any interference between cores 104. Examples of such a level of performance assurance are the performance assurance associated with the DO178B safety levels.

In general, a determination is made for each partition as to an amount of interference that the partition is able to tolerate (or that is otherwise acceptable) during the execution of that partition. As used herein, "interference" refers to any degradation of the performance of the execution of a partition on a particular core 104 due to the execution of one or more other partitions on one or more other cores 104. Such interference includes, for example, contention for access to memory 118, I/O devices, and power. Also, some multi-core processor units 102 (such as the FREESCALE QorIQ P4080 multi-core architecture) permit the execution frequency and power of individual cores 104 to be independently adjusted on a core-by-core basis to some extent to provide a power versus speed trade-off, which will also impact the interference between cores 104.

The amount of interference depends on, for example, the multi-core architecture that is used and how it is configured. Multi-core architectures offer a number of configuration choices that can affect interference, such as numerous cache configuration options. The way software applications are allocated to physical and virtual memory may also affect interference.

The amount of interference also depends on how the partition software 112 is implemented. Software that is structured so that its working set fits in local (unshared) cache is much more immune to interference than software that must make relatively many accesses to shared cache or shared memory controllers. Coding guidelines can be used that would help software developers create software that is less subject to interference, or software where it is easier to verifiably bound interference to the required safety level.

The amount of interference between cores 104 can be significant. In theory, there can be up to a factor-of-N impact on thread execution times in an N-core processor. Slow-downs close to 50% have been reported for dual-core experiments, slow-downs close to 100% for quad-core experiments. Assured upper bounds on interference, which would be needed for certification in some applications, will typically be larger than observed interference.

One way to quantitatively define interference to an ARINC 653 process executing on a core 104 of a multi-core processor unit 102 is:

WCET with interference=WCET without interference*$X$ where WCET stands for Worst Case Execution Time and $X$ is a simple scalar that depends in a complex way on the architecture of the multi-core processor unit 102, the other threads running on that unit 102, the way the unit 102 (including software 106) is configured, and the level of assurance that is required that $X$ is an upper bound.

One way to quantitatively define the duration needed for a particular schedule window for a particular partition is:

Duration with interference=Duration without interference*$Y$ where Duration is the partition window duration (that is, the amount of time scheduled for execution of that partition), which for example is a value arrived at by consensus between the system architect and the partition developer and given to the module integrator. The different processes within a partition may have different thread interference factors.

In some embodiments, obtaining no interference ($X=1$) is neither feasible nor necessary. For example, it is possible to certify partitioned systems even with some partition-to-partition interference due to caching effects at context swaps. In such embodiments, it is a goal to reduce interference and it is typically a requirement to bound interference in such a way that partitions can be developed and verified independently of each other and that a module can be integrated with no need to re-verify individual partitions.

Thus, it is desirable to reduce, predict, bound, and verify interference. Interference can be reduced by selecting among alternative multi-core processor units the ones that have lower interference, by better use of hardware configuration parameters (for example, cache control bits), or by better module scheduling and configuration. Predicting interference means determining values for the above scaling factors $X$ and $Y$ (for example, for use by module integrators during configuration). Bounding interference means determining upper bounds on the above scaling factors $X$ and $Y$.

While interference needs to be bounded in such partitioned system, there may be different levels of assurance in the bound. There may also be bounds that are independent of configuration, and bounds that may depend on the configuration (in which case some re-verification of the application is typically needed for each configuration). The latter may be needed if there is a large difference between the two (for example, where hosted partition execution times dramatically increase when other applications are executing, even if the other applications are not specifically designed to cause the worst case interference possible).

Verifying means assuring upper bounds in a manner acceptable to a relevant certification authority or standard (for example, per DO178B and the United States Federal Aviation Authority (FAA)), and more generally the use of methods to assure that interference does not invalidate assurance of application partition correctness. For example, a method of bounding interference and producing interference scaling factors that is acceptable for a partition having DO178B safety level C may not be acceptable for a partition having DO178B safety level A. In the context of DO178B, verifying performance is part of verifying software coding and integration and compliance with low-level requirements, and verification with independence is required at DO178B safety level B and above.

Interference between multi-threads on the same core 104 may be even more complex to manage. Multi-threads can contend for resources inside the core (for example, the control and data units of the core 104 or L1 cache 120) as well as the shared memory resources (for example, memory 118, L3 cache 126, or the memory controllers 128). One approach is to turn off multi-threading of processes from different partitions.

Two broad classes of methods that could perform the WCET analysis described above are modeling and testing. Modeling relies on abstract models of the application software and host multi-core hardware. Testing runs application software and test software using various test scenarios on the host multi-core hardware. Modeling permits some prediction as well as verification; provides insight that will lead to improved control and improved testing; and will be required at higher levels of assurance. Testing may be easier to do initially; is based on the actual hardware and software and so is immune to modeling defects and does not require model validation; and will be required for verification.

One approach to verifying worst-case interference is to develop a performance adversary, which is software designed to cause maximal interference with the partition under test. The performance adversary runs concurrently with the partition under test on the multi-threads and cores not being used by the partition under test. Traditional performance testing methods are then applied to determine a WCET for the partition in question.

Adversaries can be developed for each specific multi-core processor unit, possibly even different adversaries for different multi-threads or cores within that multi-core processor unit. The design of the adversary software is based on detailed knowledge of the multi-core processor hardware. However, adversary threads on different cores may interfere with each other, and interference may depend on operating system behavior, for example, some scheduling methods may migrate processes between cores and incur costs for that. Also, a worst-case adversary will likely interfere with a partition more than the other partitions actually integrated with it in the final module, and the overly-pessimistic results could be a source of inefficiency.

Methods used to determine worst-case execution paths (and test data to exercise them) through software on uni-core processors may not be as accurate for multi-cores. The worst-case path on a single core may not be the worst-case path on a multi-core because interference may be different for different paths. To the extent that such methods use empirical data (for example, basic block timing measurements), the methods should use empirical data collected on the target multi-core processor unit in the presence of performance adversaries.

Testing typically needs to be accompanied by modeling, a category that includes analytic models and simulations. The two approaches are complementary. Some modeling is needed to help develop good tests, some testing is needed to validate models, and there are hybrid approaches in which model parameters are obtained by testing. At high safety levels, DO178-B requires that both testing and analysis methods be simultaneously applied.

A significant amount of work has been done to model caching effects in single-core processors to predict worst-case execution times, and this can be extended to multi-core processors. Also, more approximate component models, such as simple linear throughput models or network calculus arrival and service curve models, can be used. For example, parameters of models may be determined from design data supplied by the multi-core processor vendor or by carefully designed measurements (tests) of multi-core processor products.

Figure 3:
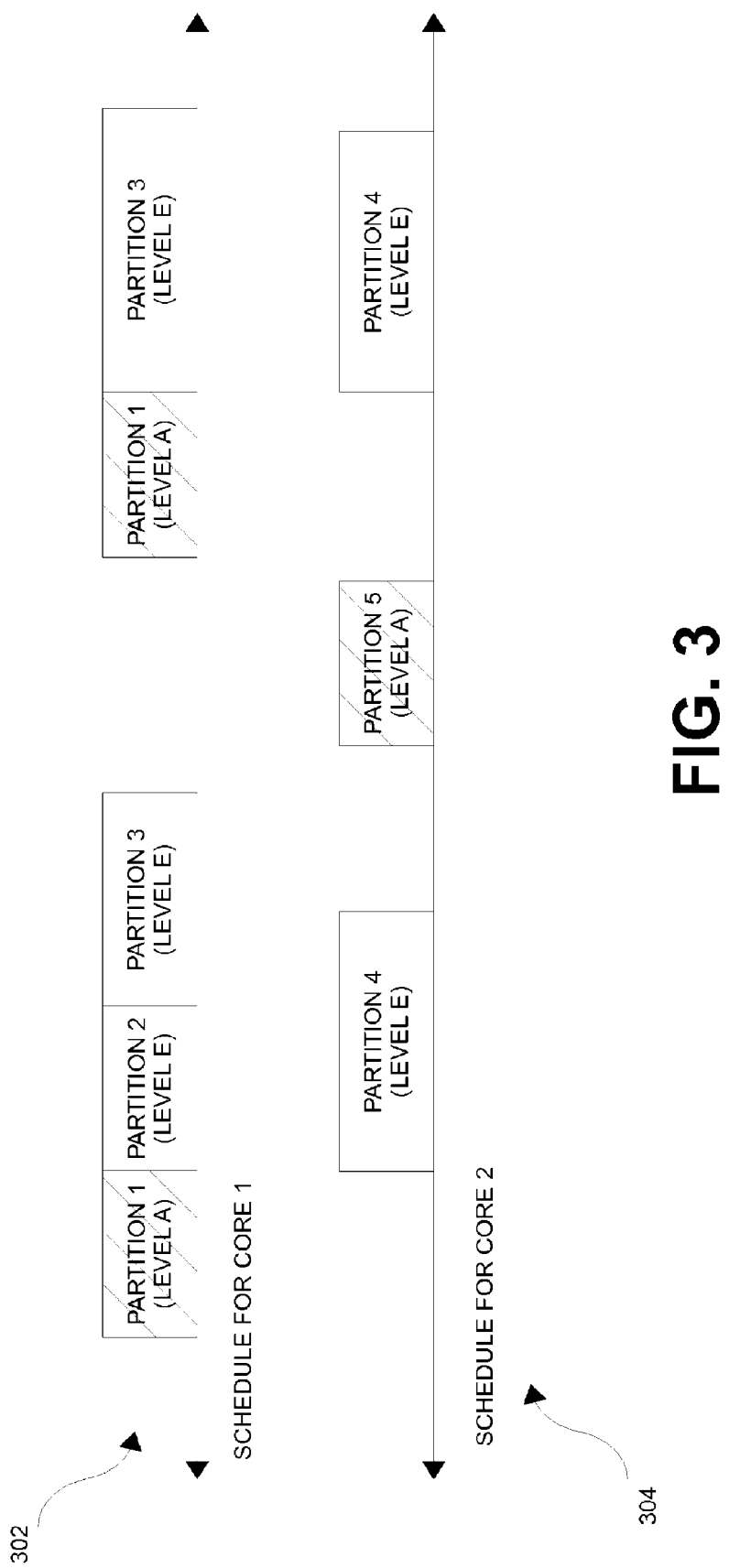
FIG. 3 is a block diagram of one example of a set of schedules for a simple example.

FIG. 3 is a block diagram of a set of schedules for a simple example. The particular example shown in FIG. 3 is described here as being implemented using the system 100 described above in connection with FIGS. 1-2 (though it is to be understood that other embodiments are implemented in other ways). In the particular example shown in FIG. 3, two cores 104 are used to execute the partitions. Each of the cores 104 that are used to execute partitions has its own respective schedule 302 and 304.

Some combinations of partitions can be scheduled to overlap on some cores 104, depending on how well and to what assurance interference can be bounded. In this example, for at least a subset of the partitions, no interference due to the execution of other partitions is acceptable while some amount of interference is acceptable for the other partitions. For example, the system may be configured using the assumption that no interference is acceptable for partitions having a high DO-178B safety level (for example, level B or above) while some amount of interference is acceptable for partitions having lower DO-178B safety level (for example, level D and below). In the particular example shown in FIG. 3, the DO-178B safety level for partitions 1 and 5 is level A while the DO-178B safety level for the other partitions (partitions 2, 3, and 4) is level E. During those schedule windows in which a level A partition is executing on one of the cores 104, the other cores 104 are operated in an empty or idle mode in which none of the other partitions are executed. In one implementation, the other cores 104 execute idle mode software that does not access any shared resources or otherwise interfere with the execution of the partition executing on the respective core 104 (for example, by executing an empty loop). In another implementation, the other cores 104 are placed in an idle mode that is supported by the multi-core processor unit 102. In this way, when a level A partition is executing on one of the cores 104, the other cores 104 are operated in a manner that does not interfere with the execution of the level A partition.

A threshold on DO-178B safety level is one way to distinguish partitions that must be given interference-free scheduling windows. In another finer-grained approach, partitions are distinguished based on timing safety level (for example, a partition whose integrity must be verified to DO-178B level A might nevertheless be tolerant to deadline overruns and could thus be permitted interfering (overlapping) scheduling windows). With such an approach, interference prediction and verification methods meeting the required level of assurance would need to be used.

In the example shown in FIG. 3, the two schedules 302 and 304 do execute level E partitions concurrently on the two cores. In this case, the partitions will interfere with each other. In such an example, this interference is bounded and taken into account. One way to do this is to have each partition developer specify a partition duration that reflects maximum possible interference. However, that may be pessimistic and thus inefficient if the schedule generated by the module integrator leaves some other cores 104 idle during a partition window, or if the actual interference from the other partitions is much lower than the maximum possible interference on that multi-core processor architecture.

Figure 4A:
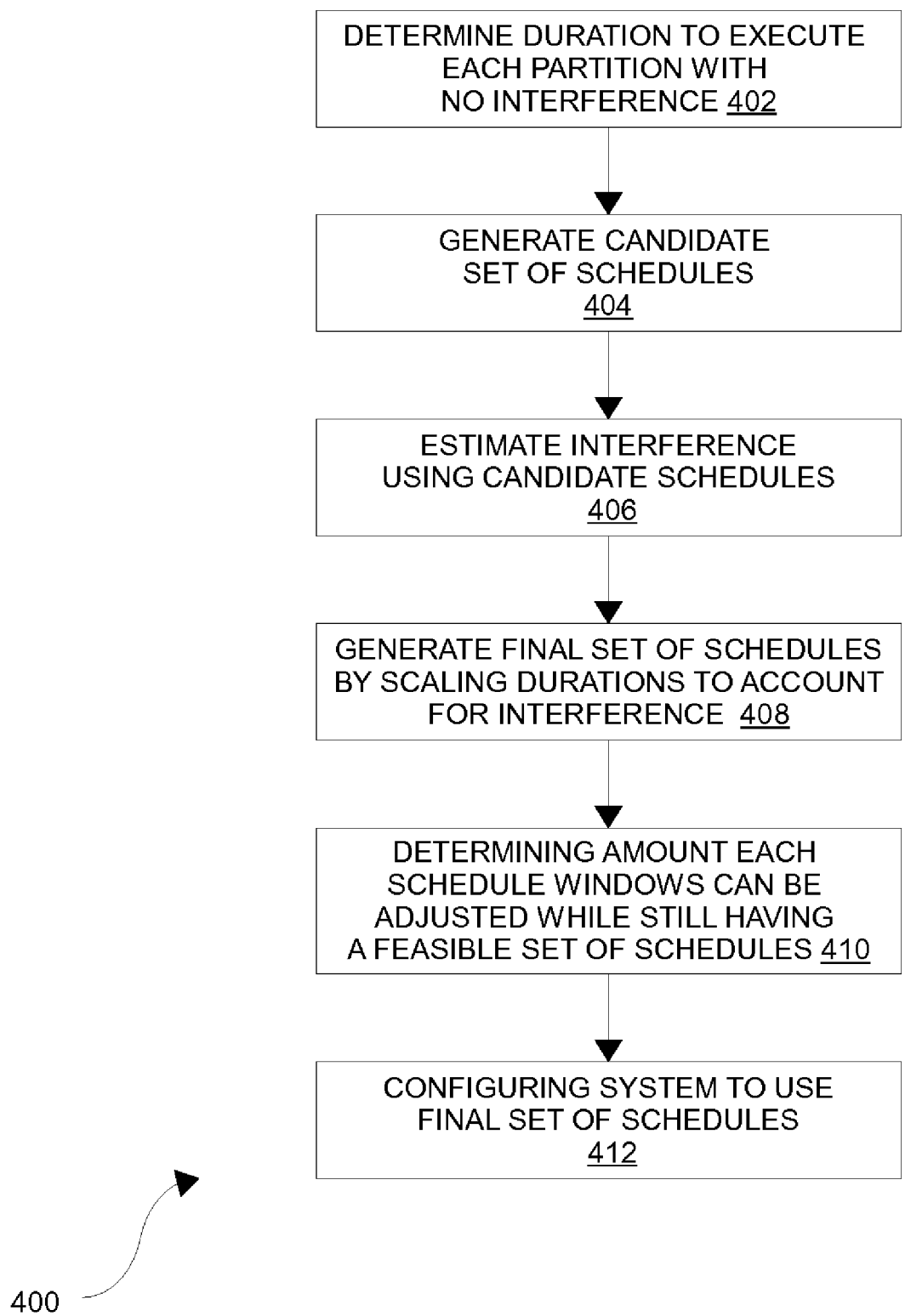
FIG. 4A is a flow diagram of one embodiment of a method of generating a set of schedules.

In another approach, a more efficient set of schedules can be generated if the module integrator has a function over a set of partitions that gives how much the schedule window duration should be increased due to interference. FIG. 4A is a flow diagram of one embodiment of a method of generating a set of schedules using such an approach. The particular embodiment of method 400 shown in FIG. 4A is described here as being implemented using the system 100 described above in connection with FIGS. 1-2 (though other embodiments can be implemented in other ways). Method 400 is performed at configuration time (that is, when a system is configured).

Method 400 includes determining a duration to execute each of the plurality of partitions without interference (block 402). Each such duration is also referred to here as the "interference-free duration" for the respective partition. In one implementation of such an embodiment, the developer of each partition provides such information to the module integrator. In another implementation, the modular integrator determines this information, for example, via a combination of testing and modeling. In some implementations, the interference-free duration for each partition comprises a worst-case execution time (WCET) with no interference for the partition.

Method 400 further includes generating a candidate set of schedules using the interference-free durations for the plurality of partitions (block 404). For example, in one implementation, the schedules are arranged so that the particular schedule window (or windows) that are assigned to each partition is sufficient to meet the inference-free duration for that partition. As noted above, multiple processor cores 104 are used for the execution of the partitions.

Method 400 further includes estimating how much interference occurs for each partition when the partitions are executed on the multi-core processor unit using the candidate set of schedules (block 406). The amount of interference can be estimated using, for example, testing and/or modeling. For example, the adversary testing approaches described above can be used.

Method 400 further includes generating a final set of schedules by scaling the durations in order to account for the estimated interference (block 408). In this embodiment, the developer of each partition provides information to the module integrator that defines a relationship between interference and schedule window duration for that partition. This relationship is used by the module integrator to determine if, and by how much, the schedule window (or windows) assigned to that partition should be scaled up or down. In this embodiment, the developer of the partition developed the partition in a way that scaling does not invalidate the performance assurances for that partition. That is, the partition developer should have developed the partition with the understanding that the schedule window for that partition may be increased (just like partition developers know that there are some cache impacts at the start of a schedule window in uni-processor systems) and is responsible for verifying that the partition software is robust against this sort of variability.

In this embodiment, partition swap times are also taken into account in generating the candidate and final sets of schedules (including the possibility of having their durations scaled by the module integrator). Interference due to other factors is also taken into account.

Power management should also be considered in developing the schedules. In the particular embodiment shown in FIG. 4A, method 400 further includes determining an amount each of the schedule windows can be adjusted while still having a feasible set of schedules (block 410). As used herein a "feasible set of schedules" refers to a set of schedules that meets the various performance assurances associated with each of the partitions. This adjustment information is included with this final set of schedules and can be used at run-time (as described below in connection with FIG. 4B).

Method 400 further includes configuring the multi-core processor unit 102 to use the final set of schedules to control the execution of the partitions using at least two of the cores (block 412). More specifically, the final set schedules are installed on the system 100 as the set of schedules 206 and are used by the scheduling function 204 to control the execution of the partitions on the cores 104 of the multi-core processor unit 102. In one implementation of such an embodiment, the set of schedules 206 are implemented as a set of schedule tables that are stored on the storage medium 116 on which the operating system 108 (and other configuration data therefor) is stored.

It should be noted that the candidate set of schedules (and the resulting final set of schedules) can be configured so that, while each of a subset of the partitions is executed on a respective one of the plurality of cores, no other partition is scheduled to execute at that time on any of the other cores as described above in connection with FIG. 3. In such an example, the other cores are operated, for example, in an idle or empty mode that does not interfere with the execution of the core 104 on which a partition is executing.

Figure 4B:
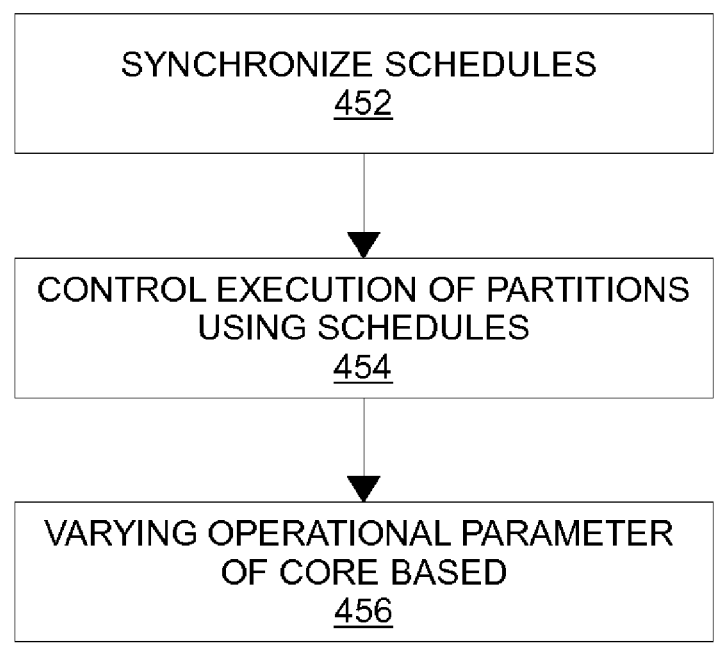
FIG. 4B is a flow diagram of one embodiment of a method that uses a set of final schedules generated by method of FIG. 4A to control the execution of a plurality of partitions on a multi-core processor unit.
Figure 4B:
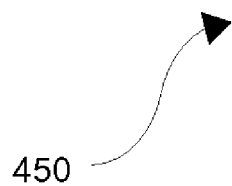

FIG. 4B is a flow diagram of one embodiment of a method 450 that uses a set of final schedules generated by method 400 of FIG. 4A to control the execution of a plurality of partitions on a multi-core processor unit. The particular embodiment of method 450 shown in FIG. 4B is described here as being implemented using the system 100 described above in connection with FIGS. 1-2 and the final set of schedules generated as described above in connection with FIG. 4A (though other embodiments can be implemented in other ways). Method 450 is performed at run-time.

Method 450 includes synchronizing the set of schedules 206 used by the scheduling function 204 (block 452). More specifically, the partitioning kernel 110 synchronizes the set of schedules on all the cores 104 with each other (for example, to be driven by the same periodic clock interrupt). This is done so that events that appear at the same time in multiple schedules 206 occur at nearly identical times on the multiple cores 104 at run-time.

Method 450 further includes controlling the execution of the plurality of partitions on the cores 104 of the multi-core processor unit 102 using the generated set of schedules 206 (block 454). As noted above, the scheduling function 204 of the partitioning kernel 110 uses each of the set of schedules 206 to determine, at any given point in time, what (if any) partition (more specifically, the partition software 112 for that partition) is to be executed on the core 104 associated with that schedule. As noted above, in the particular embodiment described here, for those parts of a schedule where no partition is scheduled for execution on a particular core 104, the partitioning kernel 110 is placed in an idle or empty mode so that it does not interfere with any partitions that are executing on other cores 104.

Method 450 further includes varying at least one operational parameter associated with at least one of the plurality of cores based on a variance amount included in the set of schedules 206 (block 456). As noted above, some multi-core processor architectures permit the frequency and power of individual cores 104 to be adjusted independently to some extent to provide a power versus speed trade-off. In this particular embodiment, the set of schedules 206 includes information indicating an amount each of the schedule windows can be adjusted while still having a feasible set of schedules (as described above in connection with FIG. 4A). This enables the system 100 to be configured to scale the schedule windows at run-time in order for system 100 to conserve power by reducing the amount of power used by the cores 104 and/or by otherwise reducing the operating frequency of the cores 104.

In one implementation, the system 100 is configured to select from a discrete set of performance-versus-power profiles (reflecting various available hardware power-versus-performance choices), where each profile specifies a set of scaling parameters (one for each schedule window included in the set of schedules 206) that achieves a particular power-versus-performance tradeoff while still obtaining a feasible set of schedules. In this way, the run-time operation of a system 100 can be adjusted to conserve power (or reduce heat) while still satisfying the various performance and interference assurances associated with the partitions. In some embodiments, a benefit of reducing the core processor speed is that the ratio of core-to-bus speed probably decreases, which means the worst case execution time variance may actually be reduced. Thus, in such embodiment, clock speeds may be optimized to get maximal work performed in a multi-core system.

If it is possible to configure a particular multi-core processor unit 102 so that one core 104 can be guaranteed to not interfere with another core 104 (for example, fully partition any shared caches and insure distinct cores use distinct memory controllers), then high timing safety level partitions (for example, DO-178B safety level A partitions) can be concurrently executed on those cores 104. If it is possible to configure a particular multi-core processor unit 102 so some cores 104 can be guaranteed to have higher priority access to any shared hardware resources, then a high timing safety level partition could be executed on that core 104 concurrently with lower timing safety level partitions on the cores 104 that might be blocked at contentions.

Figure 5:
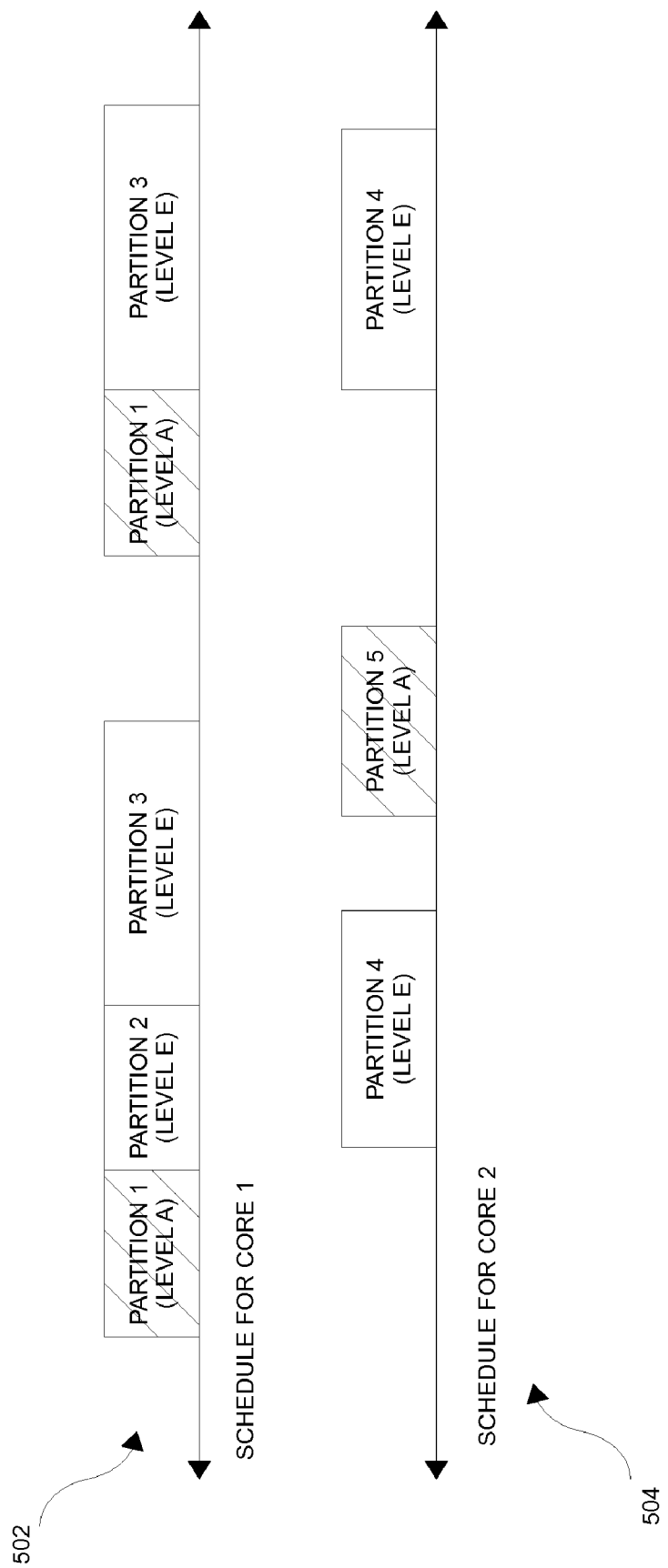
FIG. 5 is a block diagram of one example of a set of schedules for use where a multi-core processor unit is configured so that one core can be guaranteed to not interfere with another core.

FIG. 5 is a block diagram of a set of schedules for such an example. The particular example shown in FIG. 5 is described here as being implemented using the system 100 described above in connection with FIGS. 1-2 (though it is to be understood that other embodiments are implemented in other ways). In the particular example shown in FIG. 5, the multi-core processor unit 102 is configured so that two cores are used to execute partition software 112. As is shown in FIG. 1, the multi-core processor system 100 includes two separate L3 caches 126 and two separate memory controllers 128. In this example, the system 100 is configured so that one of the L3 caches 126 and one of the memory controllers 128 are used exclusively by one of the cores 104 on which partitions are executed while the other one of the L3 caches 126 and the other one of the memory controllers 128 are used exclusively by the other one of the cores 104 on which partitions are executed. As a result, partition 5 (having DO-178B safety level A) is executed at least partially concurrently with partition 3.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of generating a set of schedules for use by a partitioning kernel to execute a plurality of partitions on a plurality of processor cores included in a multi-core processor unit, the method comprising:
   determining a duration to execute each of the plurality of partitions without interference;
   generating a candidate set of schedules using the respective duration for each of the plurality of partitions;
   estimating how much interference occurs for each partition when the partitions are executed on the multi-core processor unit using the candidate set of schedules;
   generating a final set of schedules by, for at least one of the partitions, scaling the respective duration in order to account for the interference for that partition; and
   configuring the multi-core processor unit to use the final set of schedules to control the execution of the partitions using at least two of the cores.

2. The method of claim 1, wherein determining a duration to execute each of the plurality of partitions without interference comprises determining a worst-case execution time (WCET) for each of the partitions without interface and then setting the duration for each partition based on the respective WCET for that partition.

3. The method of claim 1, wherein how much interference occurs for each partition when executed on the multi-core processor unit using the candidate set of schedules is estimated using at least one of testing and modeling.

4. The method of claim 1, further comprising:
   determining, for at least one of the partitions, an amount by which a schedule window duration assigned to that partition in the final set of schedules can be increased while still having a feasible schedule; and
   varying at least one operational parameter associated with at least one of the plurality of cores based on the amount.

5. The method of claim 4, wherein the at least one operational parameter associated with at least one of the plurality of cores comprises at least one clock frequency for the at least one of the plurality of cores and an operational voltage for the at least one of the plurality of cores.

6. The method of claim 4, wherein the at least one operational parameter associated with the at least one of the plurality of cores is varied in order to reduce power consumption.

7. The method of claim 1, further comprising configuring the candidate set of schedules so that, while each of a subset of the partitions is executed on a respective one of the plurality of cores, no other partition is scheduled to execute at that time on any of the other cores.

8. The method of claim 1, wherein the respective duration to execute each of the plurality of partitions without interference is received from a developer of the partition.

9. The method of claim 1, wherein the plurality of cores comprises a first subset and a second subset;
   wherein the method further comprises:
       configuring each core included in the first subset to access a first shared resource; and
       configuring each core included in the second subset to access a second shared resource different from the first shared resource; and
   wherein while a first partition is executed on a first core included in the first subset of cores and a second partition is executed on a second core included in the second subset of cores, the first partition accesses the first shared resource and the second partition accesses the second shared resource.

10. The method of claim 1, wherein each of the plurality of cores has an associated schedule that indicates when partitions are to be executed on the respective core, wherein the multi-core processor unit is configured to synchronize the schedules of all the cores.

11. A system comprising:
    a multi-core processor unit comprising a plurality of processor cores; and
    a memory coupled to the multi-core processor unit;
    wherein the system is configured so that the multi-core processor unit executes, on the plurality of cores, software comprising a plurality of partitions;
    wherein at least two of the cores are used to execute the partitions;
    wherein the execution of each partition is scheduled in a manner that satisfies a level of performance assurance that is associated with that partition despite a predetermined level of interference between cores.

12. The system of claim 11, wherein the execution of the partitions is scheduled so that while each partition included in a subset of the plurality of partitions is executed on a respective one of the plurality of cores, a respective at least one of the other cores operates in a manner that does not interfere with the execution of the respective partition included in the first subset of the plurality of partitions.

13. The system of claim 12, wherein while each partition included in the subset of the plurality of partitions is executed on a respective one of the plurality of cores, a respective at least one of the other cores operates in an idle mode that does not interfere with the execution of the respective partition included in the subset of the plurality of partitions.

14. The system of claim 12, wherein while each partition included in the subset of the plurality of partitions is executed on a respective one of the plurality of cores, all the other cores operate in a manner that does not interfere with the execution of the respective partition included in the subset of the plurality of partitions.

15. The system of claim 11, wherein the plurality of cores comprises a first subset and a second subset, wherein each core included in the first subset is configured to access a first shared resource and wherein each core included in the second subset is configured to access a second shared resource different from the first shared resource;
wherein while a first partition is executed on a first core included in the first subset of cores and a second partition is executed on a second core included in the second subset of cores, the first partition accesses the first shared resource and the second partition accesses the second shared resource.

16. The system of claim 15, wherein the first shared resource and second shared resource comprise at least one of a first and second memory caches, respectively, and first and second memory controllers, respectively.

17. The system of claim 11, wherein each of the plurality of cores has an associated schedule that indicates when partitions are to be executed on the respective core, wherein the schedules of all the cores are synchronized.

18. The system of claim 11, wherein the system comprises an integrated modular avionics (IMA) system, wherein the software comprises a partitioning kernel and an application executive interface.

19. A method of generating a set of schedules for use by a partitioning kernel to control the execution of a plurality of partitions on a plurality of cores included in a multi-core processor unit, the method comprising:
generating the set of schedules so that, for each of a first subset of the partitions, no other partition executes while that partition is being executed on one of the plurality of cores; and
configuring the multi-core processor unit to use a final version of the set of schedules to control the execution of the partitions using at least two of the cores.

20. The method of claim 19, wherein the set of schedules is generated so that, for each of a second subset of partitions, for at least a portion of duration that partition is executed on at least one of the cores, at least one other partition is executed on at least one other core.

* * * * *